(No Model.)
C. H. RUDD.
ELECTRICAL TESTING APPARATUS.
No. 504,753. Patented Sept. 12, 1893.
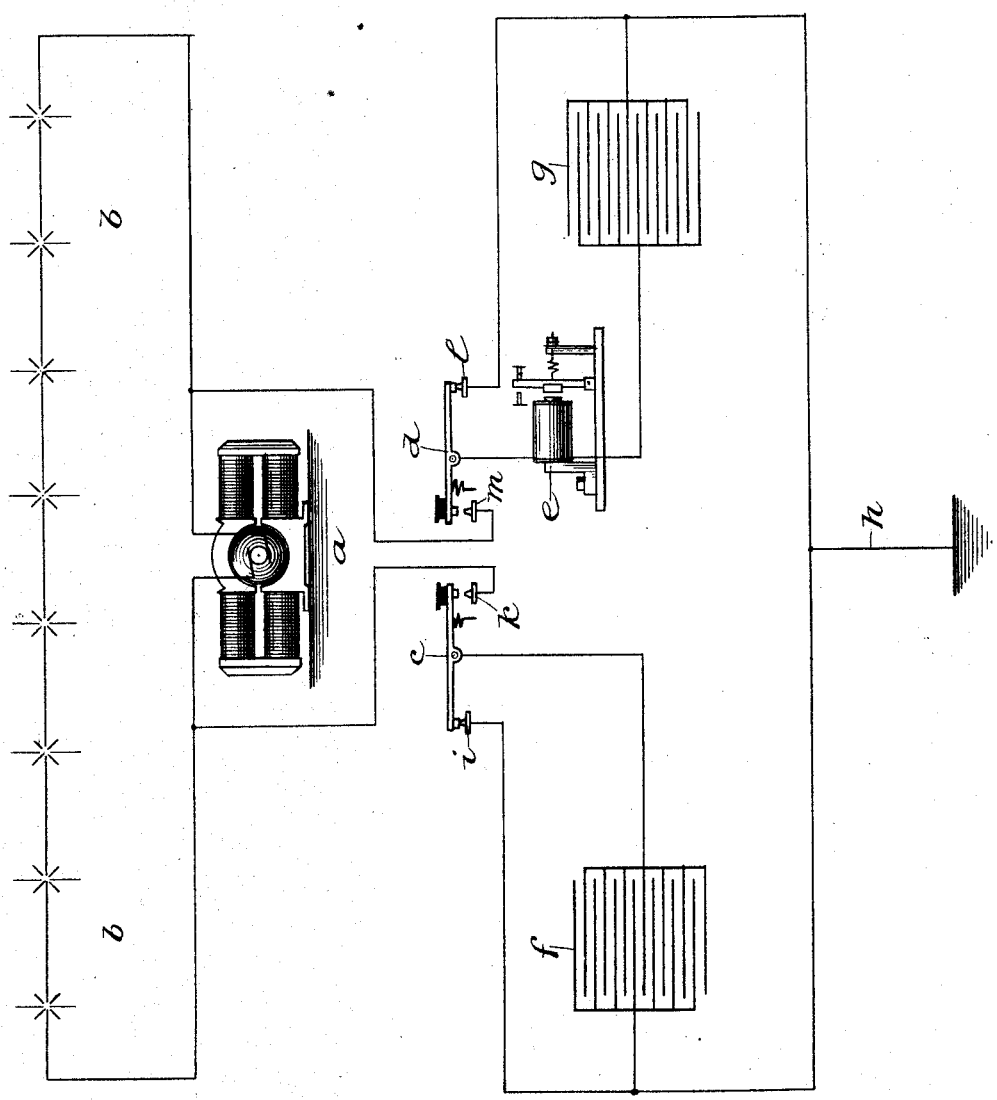
Witnesses:
Chas. G. Hawley.
Geo. R. Parker
Inventor:
Charles H. Rudd.
By. George P. Barton
Attorney.

UNITED STATES PATENT OFFICE.

CHARLES H. RUDD, OF EVANSTON, ASSIGNOR TO THE WESTERN ELECTRIC COMPANY, OF CHICAGO, ILLINOIS.

ELECTRICAL TESTING APPARATUS.

SPECIFICATION forming part of Letters Patent No. 504,753, dated September 12, 1893.

Application filed February 8, 1889. Serial No. 299,141. (No model.)

*To all whom it may concern:*

Be it known that I, CHARLES H. RUDD, a citizen of the United States, residing at Evanston, in the county of Cook and State of Illinois, have invented a certain new and useful Improvement in Electric-Circuit Testing Apparatus, (Case No. 9,) of which the following is a full, clear, concise, and exact description, reference being had to the accompanying drawing, forming a part of this specification.

My invention relates to apparatus for testing such electric circuits as are supposed to be well insulated when carrying working currents. The test is designed to discover whether a leak exists upon the circuit which is tested.

In order that my invention, together with its principles and mode of operation, may be made plain to those skilled in the art I will describe my apparatus as used in connection with an electric light circuit, as illustrated in the accompanying drawing, in which the dynamo machine $a$ is connected in the circuit $b$ containing the lamps.

My testing apparatus proper consists of keys $c$ $d$, an electro magnetic signal receiving device $e$, condensers $f$ and $g$ provided with the connections shown, the wire between the condensers being provided with a branch $h$ to ground. Key $c$ is normally held by a retractile spring or otherwise in contact with a contact $i$ in order that the condenser may not remain charged; the other contact $k$ against which key $c$ is adapted to be closed is connected with one side of the dynamo $a$. In like manner key $d$ normally rests against contact $l$ and another contact $m$ is provided which is connected with the other side of the dynamo.

The relay or electro magnetic signal device $e$ is preferably placed in the wire between condenser $g$ and the lever of key $d$; the position of the signal receiving device $e$, however, might be changed according to circumstances. For example, it might be placed upon the other side of the condenser. The object of placing the instrument $e$ between the key $d$ and the condenser $g$ is to protect the relay against being burned out as might happen if a spark should form at points $l$ and $m$ simultaneously if the instrument $e$ were in direct circuit with said points.

In testing, the key $d$ is first depressed, connection being formed from one side of the dynamo through the lever of the key, relay $e$, condenser $g$, to ground at $h$. Should no ground exist upon the lamp circuit and said circuit possess no static capacity, the relay $e$ will show no indication of current. Should the lamp circuit possess static capacity, however, a marked indication of current may appear, which, however, can be ignored in practice, as by a few depressions of the key the static charge can be removed from the circuit. If, after several depressions of the key no further indication of current is shown by the relay, it is proof that the previous indications were due to static charges and not to leaks. If, however, the relay continue to indicate a passage of current the condenser $f$ and key $c$ may be used to determine whether or not a leak exists in the following manner:—The key $d$ is first depressed, and, supposing a leak to exist—between the second and third lamps from the left, for instance—circuit will be closed from the dynamo through the key $d$, relay $e$, condenser $g$ and the ground connections back to the dynamo. The condenser $g$ will be charged to the potential of the dynamo so that when the key $c$ is depressed it will have no effect upon the relay, as the charge of condenser $g$ prevents the passage of current. If, however, no ground exist, the closing of key $d$ will not complete a circuit through condenser $g$ and, in consequence, it will not be charged, so that, when key $c$ is also closed, a circuit is completed through the keys, relay $e$, and the condensers, and a passage of current will be indicated by relay $e$.

When dealing with high potentials resistance may be introduced at such points as may be desirable for the purpose of reducing the current.

It is evident that the successful operation of this system does not depend upon the specific forms of apparatus illustrated. The signal keys may be replaced with any one of several well known switching devices. The relay might be replaced by any one of several well known electric signal receiving devices.

It is evident that the key levers $d$ $c$ should be so arranged that the user should not take hold of them both at the same time. I therefore preferably mount these keys within a box of insulating material and leave simply the rubber knobs of the keys accessible.

Having thus described my invention, I claim as new and desire to secure by Letters Patent—

1. The combination with a pair of keys connected together through condensers, of a ground connection between said condensers, a signal indicating device in circuit between one of said keys and its condenser connections from different sides of the generator in an electric circuit, one connection to a point near each of said keys and a short circuit around each of said condensers normally closed by the key thereof, whereby on depressing both of said keys to close connection with the different sides of the generator it may be determined whether a ground or leak exists upon the electric circuit in which said generator is included.

2. The combination with two keys each adapted to be closed to different sides of a dynamo included in an electric light circuit, of condensers connected in circuit between said keys, a ground branch between said condensers and a signal device between said ground connections and one of said keys, substantially as and for the purpose specified.

3. The combination with a source of electricity and a working circuit, of a connection to ground from one side of said source of electricity, containing a condenser, a current indicator, and a circuit closing key, substantially as described.

In witness whereof I hereunto subscribe my name this 8th day of January, A. D. 1889.

CHARLES H. RUDD.

Witnesses:
GEORGE P. BARTON,
ELLA EDLER.